United States Patent
Zang et al.

(10) Patent No.: US 12,370,903 B2
(45) Date of Patent: Jul. 29, 2025

(54) METHOD FOR TORQUE CONTROL OF ELECTRIC VEHICLE ON SLIPPERY ROAD SURFACE, AND TERMINAL DEVICE

(71) Applicant: GREAT WALL MOTOR COMPANY LIMITED, Hebei (CN)

(72) Inventors: Xuechen Zang, Hebei (CN); Xiaojie Wang, Hebei (CN); Leiming Du, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 87 days.

(21) Appl. No.: 18/010,479

(22) PCT Filed: Sep. 30, 2021

(86) PCT No.: PCT/CN2021/122179
§ 371 (c)(1),
(2) Date: Dec. 15, 2022

(87) PCT Pub. No.: WO2022/100319
PCT Pub. Date: May 19, 2022

(65) Prior Publication Data
US 2023/0256835 A1 Aug. 17, 2023

(30) Foreign Application Priority Data
Nov. 10, 2020 (CN) .......................... 202011249262.3

(51) Int. Cl.
*B60L 15/20* (2006.01)
*B60L 7/18* (2006.01)

(52) U.S. Cl.
CPC ............ *B60L 15/2009* (2013.01); *B60L 7/18* (2013.01); *B60L 2240/423* (2013.01); *B60L 2240/463* (2013.01)

(58) Field of Classification Search
CPC .. B60L 15/2009; B60L 7/18; B60L 2240/423; B60L 2240/463
(Continued)

(56) References Cited

U.S. PATENT DOCUMENTS 9,463,782 B2 * 10/2016 Kikawa ..................... B60L 7/18
10,974,601 B2 * 4/2021 Moriya ..................... B60L 7/10
(Continued)

FOREIGN PATENT DOCUMENTS

CN 102485528 A 6/2012
CN 104417557 A 3/2015
(Continued)

OTHER PUBLICATIONS

International Search Report for PCT/CN2021/122179 issued Jan. 6, 2022.

*Primary Examiner* — Joseph M Rocca
*Assistant Examiner* — Ahmed Alkirsh
(74) *Attorney, Agent, or Firm* — Schmeiser, Olsen & Watts LLP (57) ABSTRACT

A method for torque control of an electric vehicle on a slippery road surface and a terminal device are provided. The method includes: presetting a torque-lower-limit-value; setting, when an anti-lock braking system of the electric vehicle is activated, the torque-lower-limit-value as a second numerical value to reduce an absolute value of a reverse torque exerted on the vehicle wheel due to the energy recovery, and the vehicle wheel enters an anti-lock state; maintaining the anti-lock state of the vehicle wheel for a preset first time period; comparing the currently requested torque value with a preset third numerical value after the first time period is passed; and resetting the torque-lower-limit-value to the first numerical value to enable the vehicle wheel (Continued)

to exit the anti-lock state, if the currently requested torque value is greater than the third numerical value.

18 Claims, 3 Drawing Sheets

(58) Field of Classification Search
USPC .......................................................... 701/22
See application file for complete search history.

(56) References Cited

U.S. PATENT DOCUMENTS

| | | | | |
|---|---|---|---|---|
| 2014/0207355 A1* | 7/2014 | Akaho | ................... | B60L 3/108 |
| | | | | 701/70 |
| 2014/0257664 A1 | 9/2014 | Arbitmann et al. | | |
| 2015/0217741 A1* | 8/2015 | Kikawa | ................. | B60T 13/146 |
| | | | | 701/71 |
| 2017/0183008 A1* | 6/2017 | Isono | ............. | B60W 30/18172 |
| 2019/0039450 A1* | 2/2019 | Baba | ..................... | F16H 63/502 |
| 2019/0111790 A1 | 4/2019 | Crombez | | |
| 2021/0316614 A1* | 10/2021 | Tsuchiyama | ........ | B60W 10/198 |

FOREIGN PATENT DOCUMENTS

| | | | | | |
|---|---|---|---|---|---|
| CN | 104590037 A | | 5/2015 | | |
| CN | 104828044 A | | 8/2015 | | |
| CN | 106627171 A | * | 5/2017 | | |
| CN | 108859763 A | | 11/2018 | | |
| CN | 109305044 A | | 2/2019 | | |
| CN | 109863057 A | | 6/2019 | | |
| CN | 110667396 A | | 1/2020 | | |
| CN | 111731105 A | | 10/2020 | | |
| CN | 111959294 A | * | 11/2020 | | |
| CN | 112895911 A | | 6/2021 | | |
| DE | 102013204191 A1 | | 9/2014 | | |
| EP | 2982537 B1 | * | 9/2020 | ............ | B60L 15/025 |
| KR | 20080037342 A | | 4/2008 | | |
| WO | 2019091187 A1 | | 5/2019 | | |
| WO | WO-2021080011 A1 | * | 4/2021 | .......... | B60L 15/009 |

* cited by examiner

METHOD FOR TORQUE CONTROL OF ELECTRIC VEHICLE ON SLIPPERY ROAD SURFACE, AND TERMINAL DEVICE

CROSS-REFERENCE TO RELATED APPLICATIONS

This application claims priority to PCT/CN2021/122179, having a filing date of Sep. 30, 2021, which is based on Chinese Patent Application No. 202011249262.3, having a filing date of Nov. 10, 2020, the entire contents both of which are hereby incorporated by reference.

FIELD OF TECHNOLOGY

The following relates to the technical field of electric vehicles, and more particularly to a method for torque control on slippery road surface, an apparatus for torque control on slippery road surface, and a terminal device.

BACKGROUND

The global energy crisis problem is becoming more and more serious. Since a traditional automobile has a large energy consumption, and a tail gas of the traditional vehicle contains a plurality of pollutants in the environment, the new energy vehicles are becoming the direction of transition of the automobile industry. However, a torque control strategy of a new energy vehicle is crucial to the safety and the driving performance of the new energy vehicle and the driving experience of a driver.

At present, in order to improve an endurance mileage of an electric vehicle, kinetic energy is generally converted into electric energy to be stored in a storage battery by requesting a negative torque from a motor controller unit (Motor Controller Unit, MCU). When the electric vehicle enters a coasting state, energy recovery in a coasting process of the electric vehicle is performed. However, when the electric vehicle is moving on a slippery road surface, a vehicle wheel may be locked due to low road adhesion coefficient, and an anti-lock braking system (Anti-lock Braking System, ABS) of the electric vehicle is activated. As the vehicle wheel is locked again due to the energy recovery during the coasting process of the electric vehicle, the ABS is activated again. The safety of the electric vehicle is reduced due to the repeated activation and inactivation of the ABS, and the driving experience of the driver is seriously affected accordingly.

SUMMARY

An aspect relates to a method for torque control of an electric vehicle on a slippery road surface, and a terminal device, which aim to solve the problem in the conventional art that the safety of the vehicle is reduced and the driving experience is bad due to the simultaneous actions of the energy recovery in the coasting process of the electric vehicle and the ABS system.

II In the first aspect, a method for torque control of an electric vehicle on a slippery road surface is provided in the embodiments of the present disclosure, this method is implemented on a terminal device and includes:

presetting a torque-lower-limit-value, the torque-lower-limit-value is selected from at least two numerical values, the two numerical values are a first numerical value and a second numerical value, respectively; the first numerical value is a negative value, the first numerical value is a torque value recycled by the electric vehicle which is moving on the slippery road surface and performs an energy recovery normally during a coasting process, the second numerical value is a torque value that prevents a vehicle wheel from being locked on the slippery road surface, the second numerical value is greater than the first numerical value, and the torque-lower-limit-value is set to the first numerical value by default;

setting, when an anti-lock braking system of the vehicle is activated, the torque-lower-limit-value to the second numerical value to reduce an absolute value of a reverse torque exerted on the vehicle wheel due to the energy recovery, in order that the vehicle wheel enters an anti-lock state;

maintaining the anti-lock state of the vehicle wheel for a preset first time period;

comparing a currently requested torque value with a preset third numerical value after the first time period is passed; and resetting, if the currently requested torque value is greater than the third numerical value, the toque-lower-limit-value to the first numerical value to enable the vehicle wheel to exit the anti-lock state.

In another embodiment, the setting, when the anti-lock braking system of the vehicle is activated, the torque-lower-limit-value to the second numerical value includes:

comparing the currently requested torque value and the second numerical value when the anti-lock braking system is activated; and modifying the torque-lower-limit-value from the first numerical value to the second numerical value through a gradient processing, if the currently requested torque value is less than the second numerical value.

In an embodiment, the method further includes: setting a value of a first driving torque for driving the vehicle wheel to rotate to the second numerical value within the first time period.

In an embodiment, the method further includes: comparing the currently requested torque value with the second numerical value in real time within the first time period, and setting a second driving torque for driving the vehicle wheel to rotate according to a result of comparison between the currently requested torque value and the second numerical value.

In an embodiment, the method further includes: comparing, if the currently requested torque value is less than the second numerical value, the currently requested torque value with the torque-lower-limit-value and taking a maximum value of the currently requested torque value and the torque-lower-limit-value as the value of the second driving torque; or taking the currently requested torque value as the second driving torque, if the currently requested torque value is greater than or equal to the second numerical value.

In an embodiment, setting the torque-lower-limit-value to the second numerical value when the anti-lock braking system of the vehicle is activated includes:

comparing the current request torque value with the second numerical value when the anti-lock braking system is activated; and directly modifying the torque-lower-limit-value equaling the first numerical value to the second numerical value, if the currently requested torque value is greater than or equal to the second numerical value.

In an embodiment, a value of a third driving torque for driving the vehicle wheel to rotate within the first time period is greater than or equal to the second numerical value.

In an embodiment, the method further includes: comparing the currently requested torque value with the second numerical value in real time within the first time period and setting a fourth driving torque for driving the vehicle wheel to rotate according to a result of comparison between the currently requested torque value and the second numerical value.

In an embodiment, the method further includes: taking the second numerical value as the value of the fourth driving torque, if the currently requested torque value is less than the second numerical value; or taking the currently requested torque value as the value of the fourth driving torque, if the currently requested torque value is greater than or equal to the second numerical value.

In an embodiment, the method further includes: comparing, within the first time period after the anti-lock braking system of the vehicle is activated, the currently requested torque value detected at a second moment with the third numerical value if the anti-lock braking system is activated again at a first moment; where the second moment is a moment when the first time period is passed since a starting moment, and the first moment is taken as the starting moment;

resetting, if the currently requested torque value detected at the second moment is greater than the third numerical value, the torque-lower-limit-value to the first numerical value to enable the vehicle wheel to exit the anti-lock state; and setting a fifth driving torque for driving the vehicle wheel to rotate to the second numerical value, if the currently requested torque value detected at the second moment is less than or equal to the third numerical value.

In an embodiment, the method further includes: comparing the currently requested torque value with the preset third numerical value after the first time period is passed; and setting a sixth driving torque used for driving the vehicle wheel to rotate to the second numerical value if the currently requested torque value is less than or equal to the third numerical value.

In an embodiment, the torque-lower-limit-value is set in a torque path.

In the second aspect, a terminal device is provided in the embodiments of the present disclosure, the terminal device includes: a memory, a processor and a computer program product, comprising a computer readable hardware storage device having computer readable program code stored therein, said program code executable by a processor of a computer system to implement a method stored in the memory and executable by the processor. The processor is configured to, when executing the computer program, implement steps of the method for torque control on the slippery road surface according to any one of the embodiments.

In the third aspect, a non-transitory computer-readable storage medium is provided in the embodiments of the present disclosure, the non-transitory computer-readable storage medium stores a computer program, that, when executed by a processor of a terminal device, causes the processor of the terminal device to implement steps of the method for torque control of the electric vehicle on the slippery road surface according to any one of the embodiments.

The beneficial effects of the present disclosure are as follows: compared with the conventional art, when the activation of the ABS of the vehicle is detected, the preset torque-lower-limit-value is set to the second numerical value by using a corresponding method, so that the locking of vehicle wheel caused due to the too large absolute value of the reverse torque exerted on the vehicle wheel is effectively avoided. After the second numerical value is maintained by the vehicle for the first time period, the torque-lower-limit-value is reset to the first numerical value if the currently requested torque value is greater than the third numerical value, so that the limitation to the capability of energy recovery of the vehicle during a vehicle coasting process is relieved, and the vehicle wheel exits the anti-lock state. By applying the aforesaid method, it is ensured that the vehicle can move on the slippery road surface smoothly, the driving experience is improved, and the safety of the vehicle is ensured simultaneously.

BRIEF DESCRIPTION

Some of the embodiments will be described in detail, with references to the following Figures, wherein like designations denote like members, wherein.

DETAILED DESCRIPTION

In the following descriptions, in order to describe but not intended to limit the present application, concrete details including specific system structure and technique are proposed, so that a comprehensive understanding of the embodiments of the present application is facilitated. However, a person of ordinarily skill in the conventional art should understand that the present application can also be implemented in some other embodiments from which these concrete details are excluded. In other conditions, detailed explanations of method, circuit, device and system well known to the public are omitted, so that unnecessary details which are disadvantageous to the understanding of the description of the present application may be avoided.

Figure 1:
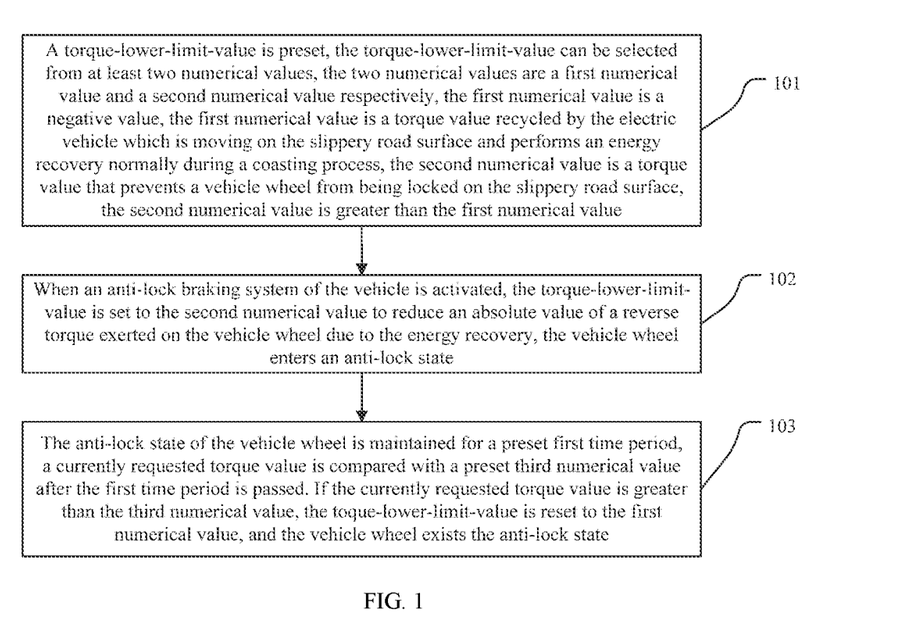
FIG. 1 illustrates a schematic flowchart of implementation of a method for torque control of an electric vehicle on a slippery road surface according to embodiments of the invention.

For the illustration of the technical solutions of the present disclosure, the technical solutions of the present disclosure are described in detail according to embodiments below:

FIG. 1 illustrates a schematic flowchart of implementation of a method for torque control of an electric vehicle on a slippery road surface according to one embodiment of the present disclosure, as detailed below.

In a step of S101: a torque-lower-limit-value is preset in a vehicle control unit (Vehicle Control Unit, VCU) of a vehicle. This torque-lower-limit-value can be selectively set to at least two values, and the two values are a first numerical value and a second numerical value, respectively. The first numerical value is a torque value recycled by a vehicle which moves on the slippery road surface and performs energy recovery normally during a coasting process. The second numerical value is a torque value that prevents a vehicle wheel from being locked on the slippery road surface. When the vehicle performs the energy recovery during the coasting process, the value of the torque at the vehicle wheel end is a negative value, both the first numerical value and the second data are negative values, and the second numerical value is greater than the first numerical value. The torque-lower-limit-value is the minimum value of the torque output corresponding to an activation condition of the anti-lock braking system (Anti-lock Braking System, ABS) of the vehicle.

During a vehicle driving process, before activation of the ABS is not detected, the torque-lower-limit-value is set to the first numerical value by default. When the vehicle performs the energy recovery during the coasting process, the reverse torque exerted on the vehicle wheel is constrained by the first numerical value. The absolute value of the reverse torque is generally not greater than the absolute value of the first numerical value. It should be noted that, in the present disclosure, a torque value that drives the vehicle to move ahead is defined as a positive value, and a torque value that drives the vehicle to move backwards is defined as a negative value.

When the vehicle moves on the slippery road surface, an adhesion coefficient between the vehicle wheel and the road surface is reduced, if the reverse torque of the vehicle wheel is still limited at the first numerical value at this time, the vehicle wheel can be locked because that the absolute value of the reverse torque of the vehicle wheel is too large. the lock of the vehicle wheel can activate the ABS of the vehicle, the ABS enables rotation of the vehicle wheel to be restored. However, because the energy recovery in the coasting process is still performed at this time, and the torque-lower-limit-value is the first numerical value. After the rotation of the vehicle wheel is restored, the vehicle wheel is locked again because that the absolute value of the reverse torque of the vehicle wheel is too large, and the ABS is activated. Due to this reason, the condition of repeated activation and inactivation of the ABS may be caused, and the driving experience and the safety of the vehicle are seriously affected.

In a step of S102, when the ABS of the vehicle is activated, the torque-lower-limit-value is set to the second numerical value to reduce the absolute value of the reverse torque exerted on the vehicle wheel due to energy recovery, so that the vehicle wheel enters the anti-lock state.

Both the first numerical value and the second numerical value are negative values, and the second numerical value is greater than the first numerical value, so that the absolute value of the second numerical value is less than the absolute value of the first numerical value. After the torque-lower-limit-value in the VCU is set to the second numerical value, the absolute value of the reverse torque exerted on the vehicle wheel is reduced, so that the locking of the vehicle wheel is effectively avoided, the ABS is avoided from being mistakenly activated, an occurrence of condition of repeated activation and inactivation of the ABS is avoided, the driving experience is improved, and the safety of the vehicle is further ensured. It should be noted that the vehicle wheel enters the anti-lock state in the step S102 is independent of the ABS system; instead, the vehicle wheel enters the anti-lock state in the step S102 is caused due to the change of the torque-lower-limit-value.

In the coasting process of the new energy electric vehicle, the negative torque used for the energy recovery in the coasting process is obtained by the VCU by looking up a table according to the current vehicle speed and the opening degree of the accelerator pedal. When the vehicle is coasting, if the brake pedal is not stepped, then, the torque used for energy recovery in the entire torque path is only the torque of energy recovery during the coasting process. In this condition, if the vehicle moves on the slippery road surface, in the present disclosure, a lower limit value is set to the vehicle wheel end torque within a certain time period, so that the absolute value of the vehicle wheel end torque is reduced, and the locking of the vehicle wheel is avoided. In this way, although the capability of energy recovery of the vehicle during the coasting process is limited within the time period, it can be ensured that the vehicle wheels cannot be locked, so that the vehicle can move on the slippery road surface smoothly. After the vehicle moves through the slippery road surface, the limitation of the vehicle wheel end torque is released, and the normal capability of energy recovery of the vehicle during the coasting process is recovered.

Figure 2:
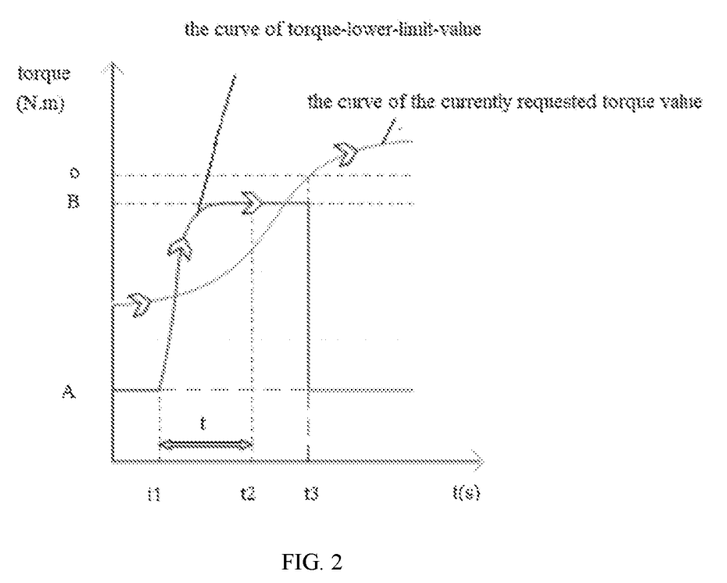
FIG. 2 illustrates a schematic diagram of controlling a torque value at a vehicle wheel end according to embodiments of the invention.
Figure 3:
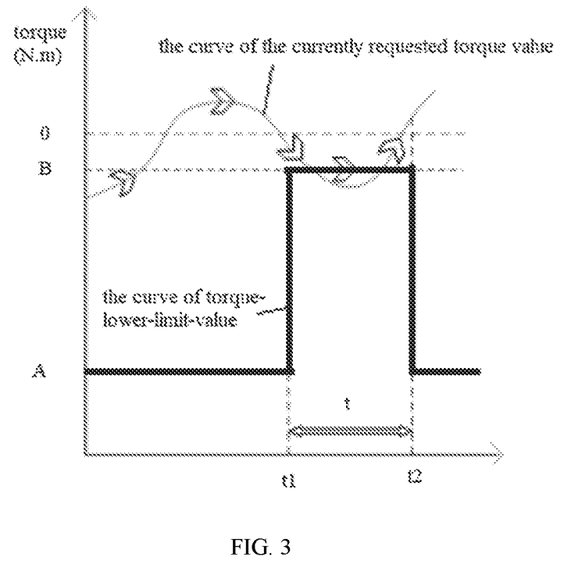
FIG. 3 illustrates a schematic diagram of controlling a torque value at a vehicle wheel end according to embodiments of the invention.
Figure 4:
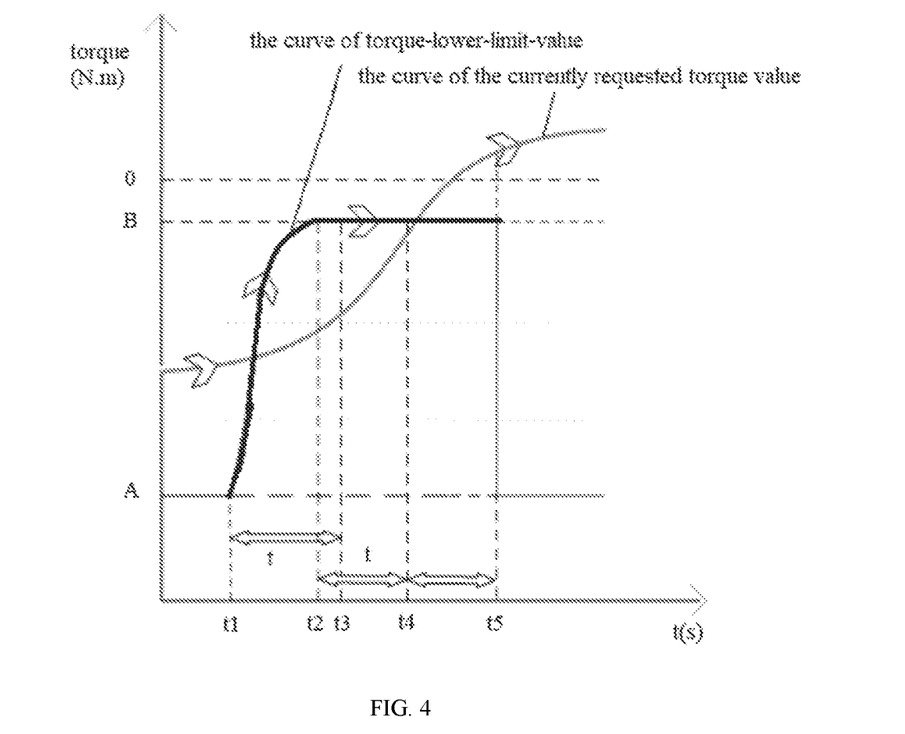
FIG. 4 illustrates a schematic diagram of controlling a torque value at a vehicle wheel end according to embodiments of the invention.

In some embodiments, as shown in FIG. 2, FIG. 3 and FIG. 4, the first numerical value may be AN·M, and the second numerical value may be BN·M. Both A and B are less than zero, and B is greater than A.

In some embodiments, at a step of S102, when the ABS of the vehicle is activated, the torque-lower-limit-value may be set to the second numerical value by performing the following steps:

comparing the currently requested torque value with the second numerical value when the ABS is activated;

modifying the torque-lower-limit-value from the first numerical to the second numerical value through a gradient processing, if the currently requested torque value is less than the second numerical value.

This method is described by taking FIG. 2 as an example. In FIG. 2, there are two curves, one curve is a changing curve of the torque-lower-limit-value, the other curve is the curve of the currently requested torque value. The arrows in FIG. 2 represent the torque value applied by the vehicle for driving the vehicle wheel to rotate. In FIG. 2, at the moment t1, the activation of the ABS is detected by the VCU, and the currently requested torque value is less than the second numerical value B, the torque-lower-limit-value is modified from the first numerical value A to the second numerical value B through a gradient processing.

In some embodiments, in the first time period, the value of the first driving torque for driving the vehicle wheel to rotate is equal to the second numerical value. That is, within the first time, the torque value used by the vehicle to drive the vehicle wheel to rotate may be the second numerical value. The starting point of the first time period is a time point when the activation of the ABS is detected.

In some embodiments, in the first time period, the currently requested torque value and the second numerical value may be compared in real time, and the second driving torque for driving the vehicle wheel to rotate is set according to the result of comparison between the currently requested torque value and the second numerical value.

A maximum value of the currently requested torque value and the torque-lower-limit-value is taken as the numerical value of the second driving torque if the currently requested torque value is smaller than the second numerical value. The currently requested torque value is taken as the second driving torque if the currently requested torque value is greater than or equal to the second numerical value.

This method is further described by taking FIG. 2 as an example. In the first time period T, the currently requested torque value and the second numerical value B are compared in real time; it can be seen that the currently requested torque value is less than the second numerical value B at any moment in the first time period T. Then, the torque value for driving the vehicle wheel to rotate is a maximum value of the currently requested torque value and the torque-lower-limit-value.

In some embodiments, at a step of S102, when the anti-lock system of the vehicle is activated, the torque-lower-limit-value is set to the second numerical value by performing the following steps:
  comparing the current request torque value with the second numerical value when the anti-lock system is activated;
  directly modifying the torque-lower-limit-value equaling the first numerical value to the second numerical value, if the currently requested torque value greater than or equal to the second numerical value.

This method is further described by taking FIG. 3 as an example. In FIG. 3, there are two curves, one curve is the changing curve of the torque-lower-limit-value, and the other curve is the curve of the currently requested torque value. The arrows in FIG. 3 represent torque values used by the vehicle for driving the vehicle wheel to rotate. In FIG. 3, at the moment t1, the activation of ABS is detected by the VCU, and the currently requested torque value is greater than or equal to the second numerical value B, the torque-lower-limit-value equaling the first numerical value A is directly modified to the second numerical value B, rather than being modified to the second numerical value B through the gradient processing.

In some embodiments, within the first time period, a value of a third driving torque for driving the vehicle wheel to rotate is greater than or equal to the second numerical value. That is, within the first time period, the torque value used by the vehicle to drive the vehicle wheel to rotate may be greater than or equal to the second numerical value.

In some embodiments, within the first time period, the currently requested torque value and the second numerical value are compared in real time, and a fourth driving torque for driving the vehicle wheel to rotate is set according to the result of comparison between the currently requested torque value and the second numerical value.

The second numerical value is taken as the value of the fourth driving torque if the currently requested torque value is less than the second numerical value; and taking the currently requested torque value as the value of the fourth driving torque if the currently requested torque value greater than or equal to the second numerical value.

This method is further described by taking FIG. 3 as an example. In the first time period t, the currently requested torque value and the second numerical value B are compared in real time; it can be seen that the currently requested torque value is greater than the second numerical value B at the two time points of the first time period t. At this time, the currently requested torque value is the torque value used by the vehicle to drive the vehicle wheel to rotate. The currently requested torque value is less than the second numerical value B at the middle of the first time period, at this time, the second numerical value B is the torque value used by the vehicle to drive the vehicle wheel to rotate.

In some embodiments, in a step of S103, the torque-lower-limit-value is arranged in the torque path. The torque path is generally arranged in a vehicle controller.

At the step 103, the anti-lock state of the vehicle wheel lasts for a preset first time period, after the first time period, the currently requested torque value and the preset third numerical value are compared. The torque-lower-limit-value is reset to the first numerical value if the currently requested torque value is greater than the third numerical value, and the vehicle wheel exits the anti-lock state.

In some embodiments, the third numerical value may be 0 N·m, the third numerical value is generally greater than the first numerical value and the second numerical value.

This method is further described by taking FIG. 3 as an example. In the FIG. 3, the activation of the ABS of the vehicle is detected at the moment t1, the moment t2 is reached after the first time period t, the currently requested torque value and the third numerical value 0 are compared at the moment t2. It can be found that the currently requested torque value at the moment t2 is greater than the third numerical value 0, the torque-lower-limit-value is reset to the first numerical value A, and the vehicle wheel exits the anti-lock state. At this time, the torque value used by the vehicle for driving the vehicle wheel to rotate is equal to the currently requested torque value.

In some embodiments, in the step of S103, after the first time, the currently requested torque value and the preset third numerical value are compared. If the currently requested torque value is not greater than the third numerical value, the sixth driving torque for driving the vehicle wheel to rotate is equal to the second numerical value.

This method is further described by taking FIG. 2 as an example. In the FIG. 2, the second moment t2 is reached after the first time t, the currently requested torque value and the third numerical value 0 are compared; it can be found that the currently requested torque value at the moment t2 is less than the third numerical value 0, and the torque value used by the vehicle for driving the vehicle wheel to rotate is still the second numerical value. The detected currently requested torque value is greater than or equal to the third numerical value 0 when the moment t3 is reached, the torque-lower-limit-value is reset to the first numerical value A, and the vehicle wheel exits the anti-lock state.

In some embodiments, in the step of S102, within the first time period after the activation of the ABS of the vehicle, if the anti-lock system is activated again at the first moment t1, the currently requested torque value and the third numerical value are compared at the second moment t2. Where the second moment t2 is a moment after the first time period t of a starting moment of the first moment t1. if the currently requested torque value at the second moment is greater than the third numerical value t2, the torque-lower-limit-value is reset to the first numerical value, and the vehicle wheel exits the anti-lock state. If the currently requested torque value is lower than or equal to the third numerical value at the second moment t2, the fifth driving torque for driving the vehicle wheel to rotate is equal to the second numerical value.

This method is further described by taking FIG. 4 as an example. There are two curves in the FIG. 4, one curve is the changing curve of the torque-lower-limit-value, and the other curve is the curve of the currently requested torque value. The arrows in FIG. 4 represent the torque values used by the vehicle for driving the vehicle wheel to rotate. In the FIG. 4, the activation of the ABS of the vehicle is detected at the moment t1. If the ABS is not activated again, the currently requested torque value and the third numerical value 0 should be compared at the moment t3, and the next operation is performed according to the result of comparison between the currently requested torque value and the third numerical value 0. However, at the moment t2 within the first time period t, the ABS is activated again, a time interval of the first time period t should be recalculated by taking the moment t2 as the starting moment, and the currently requested torque value and the third numerical value 0 are compared at the fourth moment t4. If the currently requested torque value at the moment t4 is less than the third numerical value 0, the torque value used by the vehicle for driving the vehicle wheel to rotate is the second numerical value B. Until the moment t5 is reached, the currently requested torque value is greater than the third numerical value 0, the torque-lower-limit-value is reset to the first numerical value A, and the vehicle wheel exits the anti-lock state.

According to embodiments of the method for the torque control of the electric vehicle on the slippery road surface according to the present disclosure, when the activation of the ABS of the vehicle is detected, the preset torque-lower-limit-value is set to the second numerical value by using a corresponding method according to the result of comparison between the currently requested torque value and the second numerical value, so that the locking of vehicle wheel caused due to the too large absolute value of the reverse torque exerted on the vehicle wheel can be effectively avoided. After the second numerical value is maintained by the vehicle for the first time period, the torque-lower-limit-value is reset to the first numerical value if the currently requested torque value is greater than the third numerical value, so that the limitation to the capability of the energy recovery of the vehicle during a vehicle coasting process is relieved, and the vehicle wheel exits the anti-lock state. By applying the aforesaid method, it is ensured that the vehicle can move on the slippery road surface smoothly, the driving experience is improved, and the safety of the vehicle is ensured simultaneously.

It should be understood that the values of serial numbers of the steps in the aforesaid embodiments do not indicate an order of execution sequences of the steps. Instead, the execution sequences of the steps should be determined by functionalities and internal logic of the steps, and thus shouldn't be regarded as limitation to implementation processes of the embodiments of the present disclosure.

Figure 5:
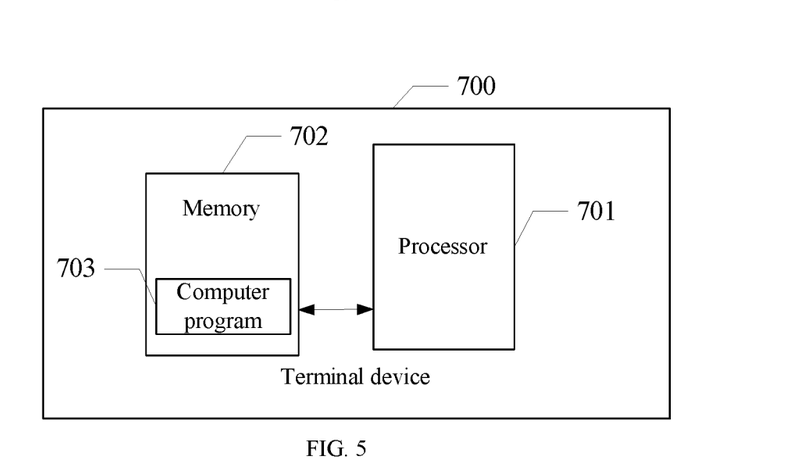
FIG. 5 illustrates a schematic block diagram of a terminal device according to embodiments of the invention.

FIG. 5 illustrates a schematic diagram of a terminal device 700 according to one embodiment of the present disclosure. As shown in FIG. 5, the terminal device 700 in this embodiment includes a processor 701, a memory 702, and a computer program 703 (e.g., a program for torque control of the electric vehicle on the slippery road surface) stored in the memory 702 and executable on the processor 701. When the computer program 703 is executed by the processor 701, the steps (e.g., the steps S101-S103 shown in FIG. 1) in the embodiments of the method for torque control of the electric vehicle on the slippery road surface are implemented.

The terminal device 700 can be a computing device such as a desktop computer, a laptop computer, a palm computer, a cloud server, etc. The terminal device 700 can include but is not limited to: a processor 701, the memory 702. A person of ordinary skill in the conventional art can understand that FIG. 5 is only one example of the terminal device 700 but should not be constituted as limitation to the terminal device 700, more or less components than the components shown in FIG. 5 may be included. As an alternative, some components or different components may be combined; for example, the terminal device 700 can also include an input and output device, a network access device, a bus, etc.

The so-called processor 701 may be central processing unit (Central Processing Unit, CPU), and can also be other general-purpose processor, digital signal processor (Digital Signal Processor, DSP), application specific integrated circuit (Application Specific Integrated Circuit, ASIC), field-programmable gate array (Field-Programmable Gate Array, FGPA), or some other programmable logic devices, discrete gate or transistor logic device, discrete hardware component, etc. The general-purpose processor may be a microprocessor, as an alternative, the processor can also be any conventional processor, or the like.

The memory 702 may be an internal storage unit of the terminal device 700, such as a hard disk or a memory of the terminal device 700. The memory 702 may also be an external storage device of the terminal device 700, such as a plug-in hard disk, a smart media card (Smart Media Card, SMC), a secure digital (Secure Digital, SD) card, a flash card (Flash Card, FC) equipped on the terminal device 700. Furthermore, the memory 702 may not only include the internal storage unit of the terminal device 700, but also include the external memory of the terminal device 700. The memory 702 is configured to store the computer program and other procedures and data needed by the terminal device 700. The memory 702 may also be configured to store data that has been output or being ready to be output temporarily.

In the aforesaid embodiments, the descriptions of the various embodiments are emphasized respectively, regarding a part of one embodiment which has not been described or disclosed in detail, reference can be made to relevant descriptions in other embodiments.

The person of ordinary skill in the conventional art may understand that the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application. However, such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features may be ignored, or not performed. In another aspect, the coupling or direct coupling or communicating connection shown or discussed could be an indirect coupling or a communicating connection through some interfaces, devices or units, and the coupling or direct coupling or communicating connection could be electrical, mechanical, or in other form.

When the computer program is executed by the processor, the steps in the various method embodiments described above may be implemented. Wherein, the computer program comprises computer program codes, which may be in the form of source code, object code, executable documents or some intermediate form, etc. The computer readable medium may include: any physical equipment or device that can carry the computer program codes, recording medium, USB flash disk, mobile hard disk, hard disk, optical disk, computer memory, read-only memory (Read-Only Memory, ROM), random access memory (Random Access Memory, RAM). Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A method for torque control of an electric vehicle on a slippery road surface, implemented by a terminal device, the method comprising:
presetting a torque-lower-limit-value in a vehicle control unit (VCU), wherein the torque-lower-limit-value is selected from at least two numerical values, the two numerical values are a first numerical value and a second numerical value, respectively, the first numerical value is a negative value, the first numerical value is a torque value recycled by the electric vehicle which is moving on the slippery road surface and performs an energy recovery normally during a coasting process, the second numerical value is a torque value that prevents a vehicle wheel from being locked on the slippery road surface, the second numerical value is a negative value greater than the first numerical value, and the torque-lower-limit-value is set to the first numerical value by default; setting, when an anti-lock braking system of the vehicle is activated, the torque-lower-limit-value to the second numerical value to reduce an absolute value of a reverse torque exerted on the vehicle wheel due to the energy recovery, in order that the vehicle wheel enters an anti-lock state; maintaining the anti-lock state of the vehicle wheel for a preset first time period; comparing a currently requested torque value with a preset third numerical value after the preset first time period is passed; and resetting, if the currently requested torque value is greater than the third numerical value, the toque-lower-limit-value to the first numerical value, and enabling the vehicle wheel to exit the anti-lock state;
wherein the setting, when the anti-lock braking system of the vehicle is activated, the torque-lower-limit-value to the second numerical value comprises:
comparing the currently requested torque value and the second numerical value when the anti-lock braking system is activated; and
modifying the torque-lower-limit-value from the first numerical value to the second numerical value through a gradient processing, if the currently requested torque value is less than the second numerical value; or alternatively,
directly modifying the torque-lower-limit-value to the second numerical value if the currently requested torque value is greater than or equal to the second numerical value;
wherein the third numerical value is greater than the first numerical value and the second numerical value.

2. The method according to claim 1, further comprising: setting a value of a first driving torque for driving the vehicle wheel to rotate to the second numerical value within the preset first time period.

3. The method according to claim 1, further comprising: comparing the currently requested torque value with the second numerical value in real time within the preset first time period, and setting a second driving torque for driving the vehicle wheel to rotate according to a result of comparison between the currently requested torque value and the second numerical value.

4. The method according to claim 3, further comprising: comparing, if the currently requested torque value is less than the second numerical value, the currently requested torque value with the torque-lower-limit-value, and taking a maximum value of the currently requested torque value and the torque-lower-limit-value as a value of the second driving torque; or
taking the currently requested torque value as the second driving torque, if the currently requested torque value is greater than or equal to the second numerical value.

5. The method according to claim 1, wherein the setting the torque-lower-limit-value to the second numerical value when the anti-lock braking system of the vehicle is activated comprises:
comparing the current request torque value with the second numerical value when the anti-lock braking system is activated; anddirectly modifying the torque-lower-limit-value equaling the first numerical value to the second numerical value, if the currently requested torque value is greater than or equal to the second numerical value.

6. The method according to claim 5, wherein a value of a third driving torque for driving the vehicle wheel to rotate within the preset first time period is greater than or equal to the second numerical value.

7. The method according to claim 5, further comprising: comparing the currently requested torque value with the second numerical value in real time within the preset first time period, and setting a fourth driving torque for driving the vehicle wheel to rotate according to a result of comparison between the currently requested torque value and the second numerical value.

8. The method according to claim 7, further comprising: taking the second numerical value as the value of the fourth driving torque if the currently requested torque value is less than the second numerical value; or
taking the currently requested torque value as the value of the fourth driving torque if the currently requested torque value is greater than or equal to the second numerical value.

9. The method according to claim 1, further comprising: comparing, within the preset first time period after the anti-lock braking system of the vehicle is activated, the currently requested torque value detected at a second moment with the third numerical value if the anti-lock braking system is activated again at a first moment; wherein the second moment is a moment when the preset first time period is passed since a starting moment, and the first moment is taken as the starting moment;
resetting, if the currently requested torque value detected at the second moment is greater than the third numerical value, the torque-lower-limit-value to the first numerical value to enable the vehicle wheel to exit the anti-lock state; and
setting a fifth driving torque for driving the vehicle wheel to rotate to the second numerical value, if the currently requested torque value detected at the second moment is less than or equal to the third numerical value.

10. The method according to claim 1, further comprising: comparing the currently requested torque value with the preset third numerical value after the first time period is passed; and setting a sixth driving torque used for driving the vehicle wheel to rotate to the second numerical value if the currently requested torque value is less than or equal to the third numerical value.

11. The method according to claim 1, wherein the torque-lower-limit-value is set in a torque path.

12. A terminal device, comprising a memory, a processor and a computer program stored in the memory and executable by the processor, wherein the processor is configured to, when executing the computer program product, implement steps of a method for torque control of an electric vehicle on a slippery road surface, the method comprising:

presetting a torque-lower-limit-value, wherein the torque-lower-limit-value is selected from at least two numerical values, the two numerical values are a first numerical value and a second numerical value respectively, the first numerical value is a negative value, the first numerical value is a torque value recycled by the electric vehicle which is moving on the slippery road surface and performs an energy recovery normally during a coasting process, the second numerical value is a torque value that prevents a vehicle wheel from being locked on the slippery road surface, the second numerical value is a negative value greater than the first numerical value, and the torque-lower-limit-value is set to the first numerical value by default;

setting, when an anti-lock braking system of the vehicle is activated, the torque-lower-limit-value to the second numerical value to reduce an absolute value of a reverse torque exerted on the vehicle wheel due to the energy recovery, in order that the vehicle wheel enters an anti-lock state;

maintaining the anti-lock state of the vehicle wheel for a preset first time period;

comparing a currently requested torque value with a preset third numerical value after the preset first time period is passed; and resetting, if the currently requested torque value is greater than the third numerical value, the toque-lower-limit-value to the first numerical value, and enabling the vehicle wheel to exit the anti-lock state;

wherein the processor is further configured to implement the step of setting, when the anti-lock braking system of the vehicle is activated, the torque-lower-limit-value to the second numerical value by:

comparing the currently requested torque value and the second numerical value when the anti-lock braking system is activated; and modifying the torque-lower-limit-value from the first numerical value to the second numerical value through a gradient processing, if the currently requested torque value is less than the second numerical value; or alternatively, directly modifying the torque-lower-limit-value to the second numerical value if the currently requested torque value is greater than or equal to the second numerical value;

wherein the third numerical value is greater than the first numerical value and the second numerical value.

13. A non-transitory computer-readable storage medium, which stores a computer program, that, when executed by a processor of a terminal device, causes the processor of the terminal device to implement steps of a method for torque control of an electric vehicle on a slippery road surface, the method comprising:

presetting a torque-lower-limit-value, wherein the torque-lower-limit-value is selected from at least two numerical values, the two numerical values are a first numerical value and a second numerical value respectively, the first numerical value is a negative value, the first numerical value is a torque value recycled by the electric vehicle which is moving on the slippery road surface and performs an energy recovery normally during a coasting process, the second numerical value is a torque value that prevents a vehicle wheel from being locked on the slippery road surface, the second numerical value is a negative value greater than the first numerical value, and the torque-lower-limit-value is set to the first numerical value by default;

setting, when an anti-lock braking system of the vehicle is activated, the torque-lower-limit-value to the second numerical value to reduce an absolute value of a reverse torque exerted on the vehicle wheel due to the energy recovery, in order that the vehicle wheel enters an anti-lock state;

maintaining the anti-lock state of the vehicle wheel for a preset first time period;

comparing a currently requested torque value with a preset third numerical value after the first time period is passed; and resetting, if the currently requested torque value is greater than the third numerical value, the toque-lower-limit-value to the first numerical value, and enabling the vehicle wheel to exit the anti-lock state;

wherein the processor is further configured to implement the step of setting, when the anti-lock braking system of the vehicle is activated, the torque-lower-limit-value to the second numerical value by:

comparing the currently requested torque value and the second numerical value when the anti-lock braking system is activated; and modifying the torque-lower-limit-value from the first numerical value to the second numerical value through a gradient processing, if the currently requested torque value is less than the second numerical value; or alternatively, directly modifying the torque-lower-limit-value to the second numerical value if the currently requested torque value is greater than or equal to the second numerical value;

wherein the third numerical value is greater than the first numerical value and the second numerical value.

14. The terminal device according to claim 12, wherein the processor is further configured to set a value of a first driving torque for driving the vehicle wheel to rotate to the second numerical value within the preset first time period.

15. The terminal device according to claim 12, wherein the processor is further configured to compare the currently requested torque value with the second numerical value in real time within the preset first time period, and set a second driving torque for driving the vehicle wheel to rotate according to a result of comparison between the currently requested torque value and the second numerical value.

16. The terminal device according to claim 15, wherein the processor is further configured to compare the currently requested torque value with the torque-lower-limit-value if the currently requested torque value is less than the second numerical value, and take a maximum value of the currently requested torque value and the torque-lower-limit-value as the value of the second driving torque; or take the currently requested torque value as the second driving torque, if the currently requested torque value is greater than or equal to the second numerical value.

17. The terminal device according to claim 12, wherein the processor is further configured to implement the step of setting the torque-lower-limit-value to the second numerical value when the anti-lock braking system of the vehicle is activated by:

comparing the current request torque value with the second numerical value when the anti-lock braking system is activated; and directly modifying the torque-lower-limit-value equaling the first numerical value to the second numerical value, if the currently requested torque value is greater than or equal to the second numerical value.

18. The terminal device according to claim 17, wherein the processor is further configured to compare the currently requested torque value with the second numerical value in real time within the preset first time period, and set a fourth driving torque for driving the vehicle wheel to rotate according to a result of comparison between the currently requested torque value and the second numerical value.

* * * * *